United States Patent [19]
Heck

[11] Patent Number: 5,242,206
[45] Date of Patent: Sep. 7, 1993

[54] AUTOMOTIVE HAIL BLANKET

[76] Inventor: Bernard J. Heck, 11515 Martha St., Omaha, Nebr. 68144

[21] Appl. No.: 937,182

[22] Filed: Aug. 31, 1992

[51] Int. Cl.$^5$ ............................................. B60J 11/00
[52] U.S. Cl. ...................................... 296/136; 150/166; 160/370.2; 52/2.22
[58] Field of Search ............ 296/95.1, 98, 136; 150/166, 168; 160/370.2; 52/2.22, 2.23, 3, 5; 291/136; 5/455

[56] References Cited

U.S. PATENT DOCUMENTS

| | | | |
|---|---|---|---|
| 1,728,437 | 9/1929 | Mott | 296/136 |
| 4,065,889 | 1/1978 | Fraioli | 52/2.23 |
| 4,207,633 | 6/1980 | Smith et al. | 5/455 X |
| 4,219,218 | 8/1980 | Waldon | 296/136 X |
| 4,294,483 | 10/1981 | Ferris | 296/136 |
| 4,612,967 | 9/1986 | Kamen et al. | 296/136 X |
| 4,699,192 | 10/1987 | Kamen et al. | 296/136 X |
| 4,807,922 | 2/1989 | Glover | 296/136 |
| 4,825,889 | 5/1989 | Monteith | 296/136 X |
| 4,991,363 | 2/1991 | Randmae | 135/88 X |
| 5,050,925 | 9/1991 | Brown | 296/136 |
| 5,112,098 | 5/1992 | Lichtmann | 296/136 |

FOREIGN PATENT DOCUMENTS

| | | | |
|---|---|---|---|
| 1106623 | 5/1961 | Fed. Rep. of Germany | 296/136 |
| 2913647 | 10/1980 | Fed. Rep. of Germany | 52/2.23 |
| 3512271 | 10/1986 | Fed. Rep. of Germany | 296/136 |
| 3629426 | 3/1988 | Fed. Rep. of Germany | 296/136 |
| 2226949 | 11/1974 | France | 52/2.23 |
| 513283 | 2/1955 | Italy | 5/455 |
| 0101822 | 6/1983 | Japan | 296/136 |
| 1440193 | 6/1976 | United Kingdom | 5/455 |

*Primary Examiner*—Dennis H. Pedder
*Attorney, Agent, or Firm*—John A. Beehner

[57] ABSTRACT

An inflatable vehicle cover is provided for protecting the body of a vehicle from damage from the force of impacting foreign objects. The cover includes a generally rectangular top cover of dimension to substantially cover the upper surface of a vehicle, to which is connected a generally rectangular bottom cover. The connection between the top and bottom covers is around the periphery of the bottom cover, thus forming a fluid-tight chamber. The bottom cover is further connected to the top cover interiorly of the periphery of the bottom cover such that two or more separate fluid-tight chambers may be formed. For introducing fluid into the various chambers, one or more stem valves is provided. Also provided is an apparatus for permitting release of fluid from the chambers, thereby allowing deflation. Finally, apparatus for securing the cover to the body of the vehicle is provided whereby the inflatable vehicle cover may cover and protect the upper surface of a vehicle.

13 Claims, 3 Drawing Sheets

AUTOMOTIVE HAIL BLANKET

BACKGROUND OF THE INVENTION

1. Technical Field

This invention relates to vehicle covers and, more particularly, to an inflatable automotive hail blanket which may be inflated in a variety of ways to provide protection from weather for vehicles.

2. Description of the Prior Art

Many vehicle covers are known for protecting vehicles from various potentially damaging conditions such as weather and road hazards. Examples of such car covers can be found by reference to U.S. Pat. Nos. 4,699,192; 4,294,483; 4,807,922; and 5,050,925. Each of these vehicle covers addresses problems of protecting certain specific areas of the vehicle such as windows, tires, etc., as well as problems relating to the efficiency of the cover itself. The vast majority of these covers, however, are not designed to be capable of being quickly installed should emergency situations arrive. Furthermore, to provide a high degree of protection to the vehicle body, the vehicle cover must be constructed of either a heavy material to resist damage or of a thick material to resist impact to the car body. The use of heavy materials in constructing a vehicle cover results in a vechicle cover which provides protection, but which is bulky and difficult to install on a vehicle. Therefore, this type of vehicle cover is not suitable for providing the emergency covering of the vehicle body, especially if the vehicle operator is not exceptionally strong. The other alternative, then, is to provide a vehicle cover which has sufficient thickness to withstand the force of impacting foreign objects. This may be accomplished by inserting padding between the outer and inner surfaces of the vehicle cover, or by providing a system of air bladders which, when inflated, will provide sufficient thickness to protect against damage. An example of an inflatable vehicle cover is found in Farris, U.S. Pat. No. 4,294,483. However, Farris is not designed for use in an emergency situation as it is inflatable only through use of an air compressor, which is not commonly found in a vehicle. Therefore, there is a need for a inflatable vehicle cover which may be used in emergency situations.

Consequently, an object of the present invention is to provide an improved inflatable vehicle cover.

Another object of the present invention is to provide an inflatable vehicle cover which may provide protection from the force of impacting foreign objects.

Yet another object of the present invention is to provide an inflatable vehicle cover which may be inflated by connection to a vehicle tire.

Still another object of the present invention is to provide an inflatable vehicle cover which may be quickly and easily installed on a vehicle for use in emergency situations.

Finally, an object of the present invention is to provide an inflatable vehicle cover which is durable in construction and safe and efficient in use.

SUMMARY OF THE INVENTION

The present invention provides an inflatable vehicle cover for protecting the body of a vehicle from damage from the force of impacting foreign objects. The cover consists of a generally rectangular top cover of dimension to substantially cover the upper surface of a vehicle. Connected to the top cover is a generally rectangular bottom cover, the connection being formed around the periphery of the bottom cover, such that a fluid-tight chamber is formed. To create two or more separate fluid-tight chambers, the bottom cover is further connected to the top cover interiorly of the periphery of the bottom cover. For introducing fluid into each of the chambers, a stem valve is attached to each chamber. Fluid may be introduced into a chamber through the stem valve for inflation of the chamber. For release of fluid from each chamber, the stem valve may be utilized or a separate valve and stopper may be included in each chamber such that when the stopper is removed from the valve, fluid may be released. Finally, a system of elastic straps or the like may be used to secure the vehicle cover to the body of the vehicle.

The use of a stem valve as the means for allowing introduction of fluid into each chamber is important to the purposes of this invention, as use of the stem valve allows each chamber to be filled from the adjacent vehicle tire or from a standard flat fixing injection container. This allows the present invention to be placed upon a vehicle for protection of the vehicle body and for the chambers to be inflated without the use of an air compressor, use of which is mandated by much of the prior art. The inflatable vehicle cover of the present invention thus may be used in a variety of emergency situations where immediate protection of the vehicle is required, such as in a severe thunderstorm or hail storm. The present invention thus provides a solution to a long-unsolved problem, that of providing emergency protection for the body of a vehicle.

DESCRIPTION OF THE PREFERRED EMBODIMENT

Figure 1:
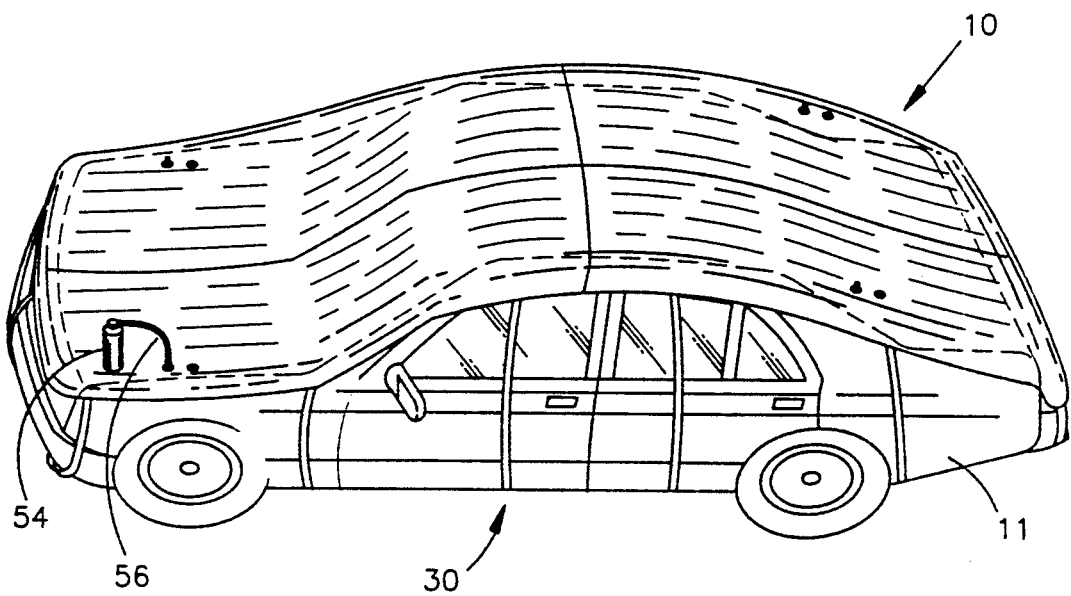
FIG. 1 is a perspective view of the vehicle cover installed on an automobile with a compressed air can connected to the valve stem of one chamber for inflating the chamber.
Figure 2:
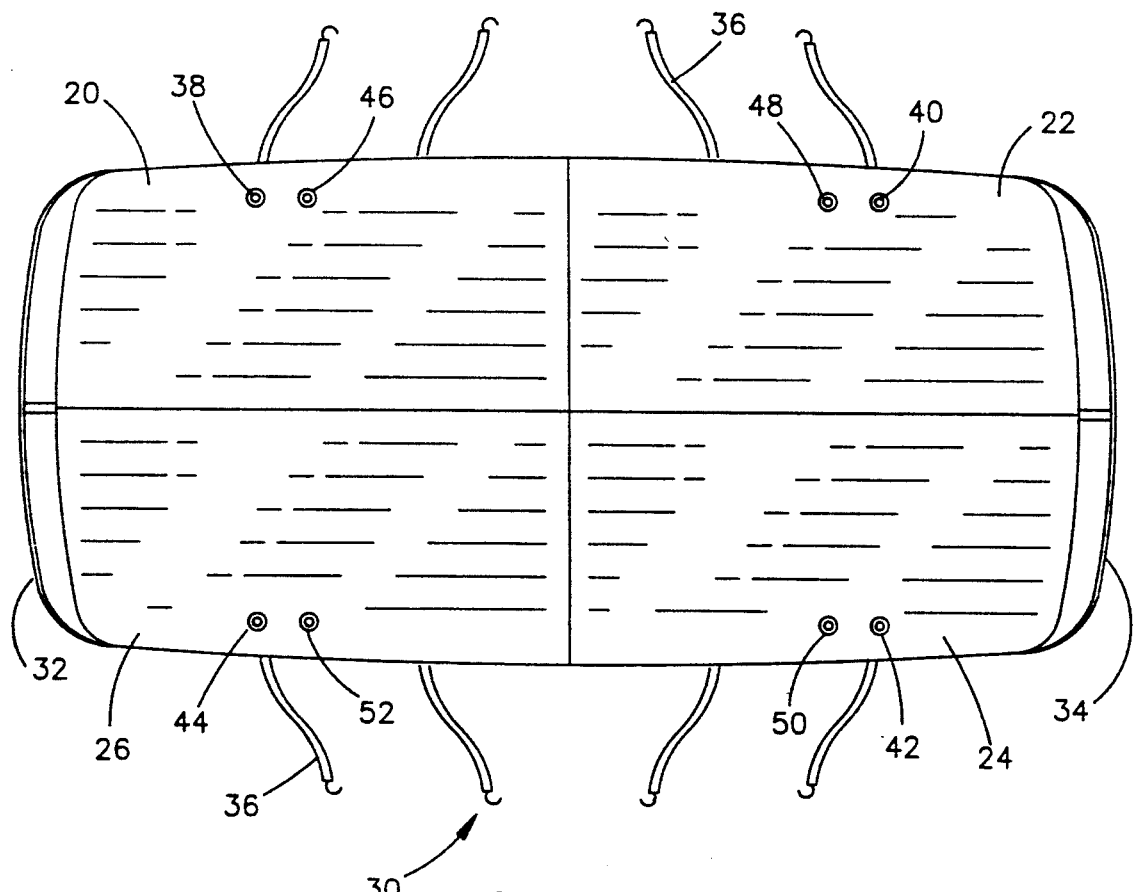
FIG. 2 is a top plan view of the vehicle cover of the invention.
Figure 3:
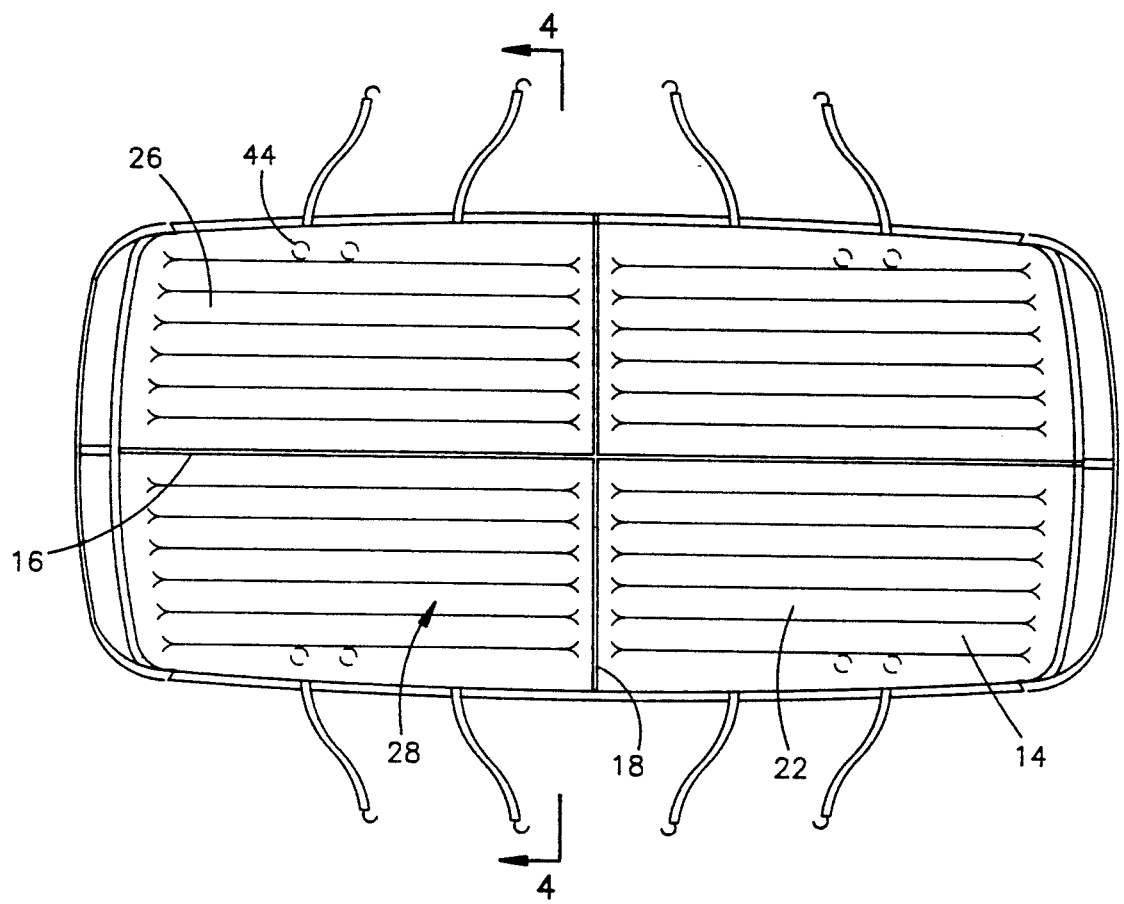
FIG. 3 is a bottom plan view of the vehicle cover of the invention.
Figure 4:
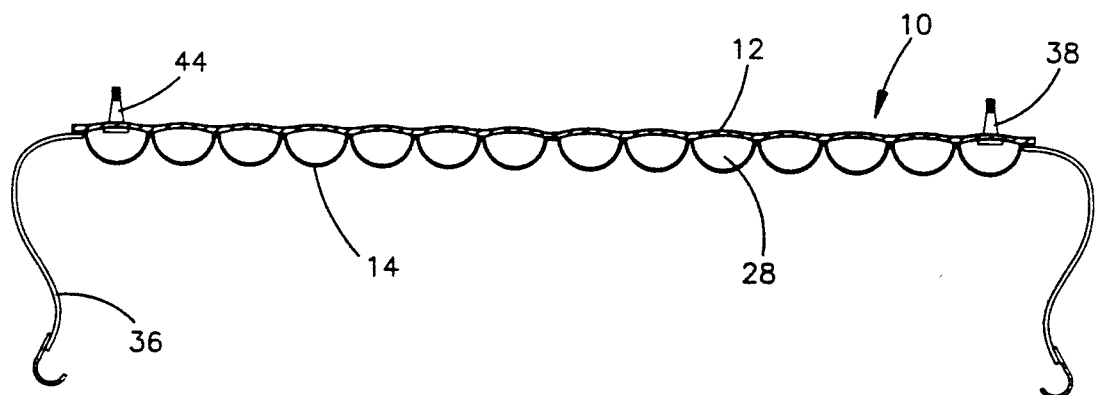
FIG. 4 is an enlarged sectional view as seen on line 4—4 in FIG. 3.
Figure 5:
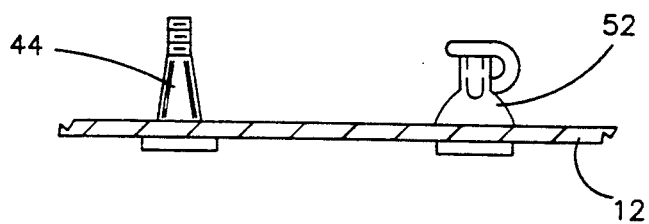
FIG. 5 is a further enlarged partially sectional side view of the stem valve and deflation valve for each chamber of the invention.
Figure 6:
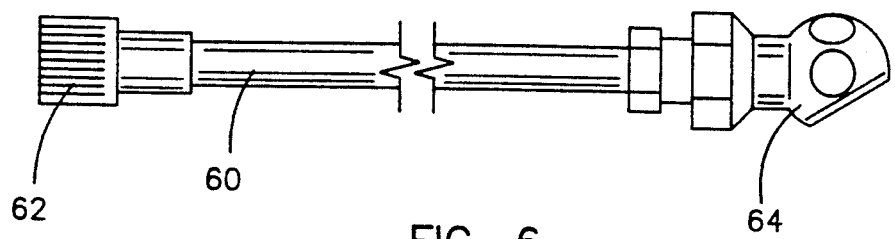
FIG. 6 is a foreshortened side view of the inflation hose of the invention.

The inflatable vehicle cover 10 is shown in its preferred embodiment in FIGS. 1-4 as including a generally rectangular top cover 12, shown best in FIG. 4 to which is attached a generally rectangular bottom cover 14. As shown in FIGS. 3 and 4, the bottom cover 14 is attached to the top cover 12 around the periphery of the bottom cover 14. The top and bottom covers 12 and 14 are joined by thermal welds in the preferred embodiment. In this manner, a fluid-tight chamber is formed.

In the preferred embodiment, the top cover 12 and bottom cover 14 are further connected along two perpendicular seams 16 and 18, which divide the single fluid-tight chamber into four smaller fluid-tight chambers 20, 22, 24 and 26, allowing Substantially no fluid communication between the chambers. Each chamber 20, 22, 24 and 26 may be further subdivided into a set of generally parallel air bladders 28 which are formed by connecting the material of the bottom cover 14 to the material of the top cover 12 at spaced intervals as shown in FIG. 4. It is preferred that each of the air bladders 28 be in limited fluid communication with other bladders in the same chamber. Such a system of fluid bladders 28 allows the inflatable vehicle cover 10 to conform more closely to the shape of the vehicle's upper surface on which the vehicle cover will be placed. Therefore, the inflatable vehicle cover 10, when placed on an automobile as shown in FIG. 1, may substantially cover the entire upper surface of the automobile, thus providing protection for the upper surface of the vehicle 11. In the preferred embodiment, the cover 10 extends approximately one foot beyond the ends and side edges of the top of the vehicle to at least partially cover the front, back and sides of the vehicle. The precise dimensions of that extension may be adjusted as preferred for various vehicle sizes and shapes.

As best shown in FIGS. 1-3, attached to the perimeter of the cover 10 are a plurality of elasticized straps 30. The front straps 32 and rear straps 34 are preferably constructed as shown in FIG. 2 as forming an elasticized basket shape designed to slip over and secure underneath the front and rear bumpers respectively. The elastic nature of the front and rear straps 32 and 34 acts to secure the front and rear sections of the Cover 10 in place. The body straps 36 are preferably attached along each side of the cover 10 and are designed to engage the underside of the vehicle 11, the body straps to be secured in place by a hook or other fastening means. When each of the straps 30 are engaged, the inflatable vehicle cover 10 is secured upon the upper surface of the vehicle 11. While the system of straps has been described With some particularity, it is to be understood that a variety of securement means may be used to secure the vehicle cover 10 in place on the vehicle 11, such as canvas straps or weights.

Figure 7:
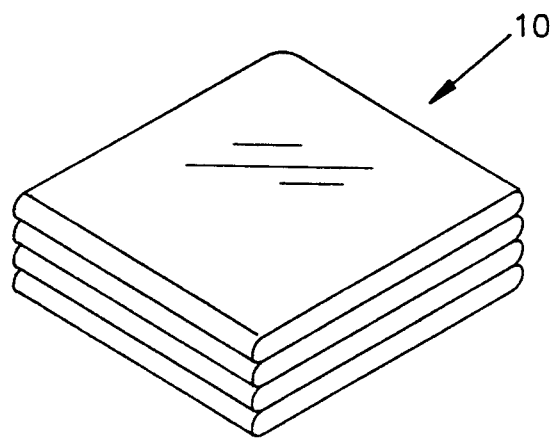
FIG. 7 is a perspective view of the vehicle cover folded flat for compact storage.

It is preferred that the top cover 12 be constructed of a heavy rubberized canvas which is waterproof, yet flexible. As the top cover 12 must endure much punishment from weathering, it is desirable that the material of which the top cover 12 is constructed be as durable as possible. The bottom cover 14 is preferably constructed of a relatively lightweight vinyl sheet such as that used in the construction of air mattresses and the like. However, the material of the bottom cover 14 should be sufficiently durable to withstand tearing and puncturing. The combination of the two flexible construction materials used in the top and bottom covers 12 and 14 thus allows the inflatable vehicle cover 10, when deflated, to be folded into a relatively compact rectangular cube, as shown in FIG. 7. The vehicle cover 10 thus may be stored in the trunk of an automobile for use in emergency situations, unlike many examples found in the prior art.

Inflation of each chamber 20, 22, 24 and 26 is achieved through a stem valve 38, 40, 42 and 44, one stem valve for each chamber. Each stem valve 38, 40, 42 and 44 is preferably mounted on the top cover 12 of the vehicle cover 10, one stem valve located adjacent each wheel of the vehicle 11 when the vehicle cover 10 is in place. Each stem valve 38, 40, 42 and 44 is preferably constructed as a standard tire stem valve having threaded connections on the upper end of the valve.

For releasing fluid from each chamber 20, 22, 24 and 26, four valve and stopper openings 46, 48, 50 and 52 are provided, one located on each chamber. While the valve and stopper openings 46, 48, 50 and 52 may be located anywhere on the respective chambers, it is preferred that the valve and stopper openings be located on the top cover 12 of the vehicle cover 10 adjacent each stem valve 38, 40, 42 and 44.

When the inflatable vehicle cover 10 is installed On the vehicle 11, inflation of the four fluid-tight chambers 20, 22, 24 and 26 is preferably performed in one of two ways. FIG. 1 displays the inflatable vehicle cover 10 of the present invention being inflated by connection to a compressed air can 54 through a hose 56. Each of the four chambers 20, 22, 24 and 26 thus may be inflated in turn by connection to a compressed air can 54.

Figure 8:
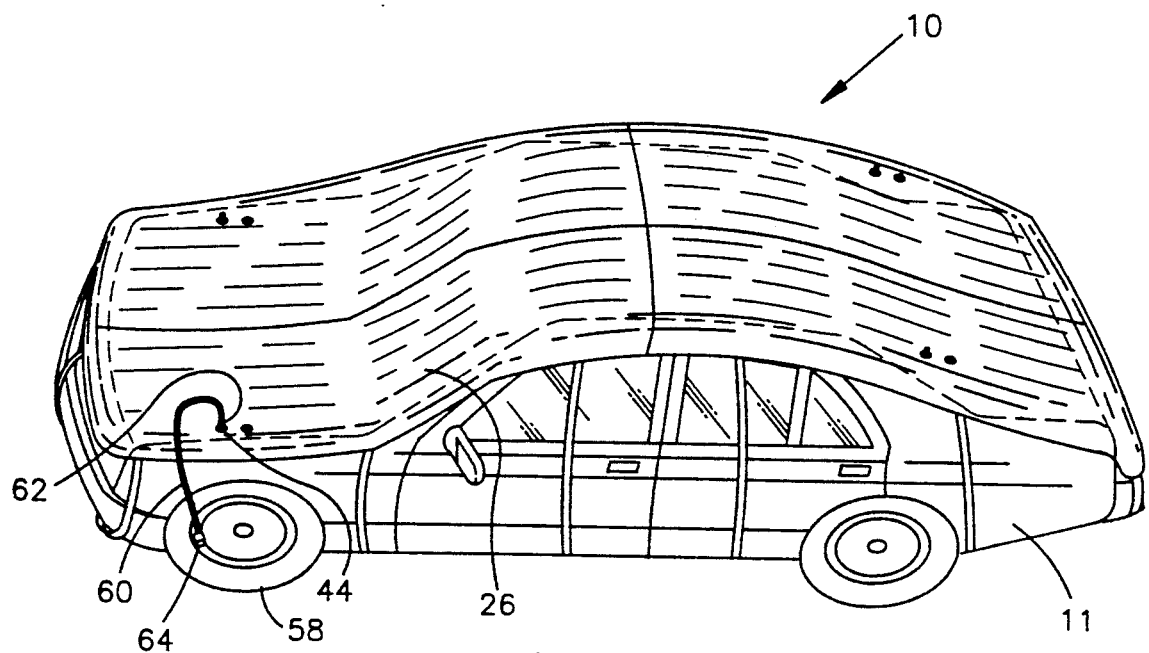
FIG. 8 is a perspective view showing the vehicle cover installed on an automobile with the inflation hose connected between one chamber and a tire for inflating the cover.

Alternatively, each chamber 20, 22, 24 and 26 may be inflated by connection to the adjacent vehicle tire. FIG. 8 displays such a connection taking place as the chamber 26 is connected to the adjacent vehicle tire 58. Connection between the vehicle tire 58 and the chamber 26 is preferably accomplished by an inflating hose 60 which at one end provides a threaded attachment 62 for connection to a stem valve 44 and at opposite end provides a standard tire stem valve attachment 64. The present invention thus may be inflated by connection to the vehicle tires, and thus does not require an air compressor for inflation. It is believed that the preferred embodiment of the inflatable vehicle cover would require six to ten (6-10) pounds of air pressure to fully inflate each of the chambers 20, 22, 24 and 26. Removing such an amount of air from each tire will not substantially impair the driveability of the vehicle, and thus a safe, efficient, and portable vehicle protection apparatus is provided.

To remove the vehicle cover 10 from the vehicle 11, each of the chambers 20, 22, 24 and 26 is deflated by removing the respective stopper from the valve and stopper opening 46, 48, 50 and 52 associated with each chamber. The elasticized straps 30 are then disengaged from the vehicle body, and the vehicle cover may then be folded and replaced in storage awaiting reusage thereof.

While the invention has been described with a high degree of particularity, it will be appreciated by those skilled in the art that numerous modifications and substitutions may be made to the vehicle cover of the invention. For example, the number and location of fluid-tight chambers may be changed, as well as the shape of the vehicle cover itself. Therefore, it is to be understood that the above description is not intended in any way to limit the scope of the present invention, which shall follow from the claims set forth below.

There has thus been set forth and described an invention which accomplishes at least all of these stated objectives.

I claim:

1. A cover having a front, a back and opposing sides, said cover for protecting the body of a vehicle having an upper surface including a hood, a roof and a trunk and four vehicle tires, two front and two rear, from damage from the force of impacting foreign objects, said cover comprising;

a top cover of dimension to cover at least some of the upper surface of a vehicle;

a bottom cover connected to said top cover around the periphery of said bottom cover such that a fluid-tight chamber is formed;

said bottom cover further connected to said top cover interiorly of said periphery of said bottom cover such that four separate rectilinear fluid-tight chambers are formed;

a plurality of release means mounted on said chambers for permitting release of fluid for deflation of said chambers, each of said chambers including at least one of said release means;

means for securing said cover tot he body of a vehicle for covering the upper surface of a vehicle;

each chamber having an inlet valve stem mounted on said chamber for allowing introduction of fluid into said chamber for inflation thereof, each valve stem positioned for placement above a respective vehicle tire upon placement of said cover onto said upper surface of said vehicle; and hose means operative to extend between and connect each valve stem and a respective vehicle tire to inflate each chamber from one of said tires whereby inflation air volume is provided by each of the vehicle's tires.

2. The cover of claim 1 wherein said top cover is constructed of a rubberized canvas.

3. The cover of claim 1 wherein said bottom cover is constructed of a vinyl.

4. The cover of claim 3 wherein said fluid-tight chambers are defined by said bottom cover.

5. The cover of claim 1 wherein said four rectilinear fluid-tight chambers are arranged two front and two rear, said connections between said bottom cover and said top cover interiorly of said periphery of said bottom cover forming generally perpendicular intersecting lines, one substantially parallel with each side of said cover.

6. The cover of claim 1 wherein said four rectilinear chambers are arranged two front and two rear.

7. The cover of claim 1 wherein said means for securing said cover to the body of a vehicle comprises elastic strapping attached to said front and said back of said cover for engagement of and securement to the front and back of a vehicle.

8. The cover of claim 7 wherein said means for securing said cover to the body of a vehicle comprises flat elastic straps attached to said sides of said cover such that said straps may engage the underside of a vehicle whereby said cover may be secured on a vehicle.

9. The cover of claim 1 wherein each of said rectilinear fluid-tight chambers has a plurality of long, narrow, interconnected fluid-containing chambers formed therein.

10. The cover of claim 1 wherein said release means comprises a valve and stopper for plugging said valve, whereby fluid may be released quickly from said chambers.

11. The cover of claim 1 wherein said connections between said top and bottom covers comprise thermal welds.

12. In combination, a vehicle having an upper surface including a hood, a roof and a rearward portion, and four vehicle tires arranged two front and two rear, and a cover having front, back and opposing sides, said cover overlying and protecting the upper surface of the vehicle from damage from the force of impacting foreign objects, said cover comprising:

a top cover of dimension to substantially cover the upper surface of said vehicle, a bottom cover connected to said top cover around the periphery of said bottom cover and interiorly of said periphery of said bottom cover such that four separate rectilinear fluid-tight chambers are formed;

a plurality of release means mounted on said chambers for permitting release of fluid for deflation of said chambers, each of said chambers including at least one of said release means;

means securing said cover to the body of said vehicle for substantially covering the upper surface of said vehicle; each chamber having an inlet valve stem mounted on said chamber for allowing introduction of fluid into said chamber for inflation thereof, each valve stem positioned above a respective vehicle tire; and hose means operative to extend between and connect each valve stem and the respective vehicle tire to inflate each chamber from one of said tires whereby inflation air volume is provided by each of the vehicle's tires.

13. The combination of claim 12 wherein said four rectilinear chambers are arranged two front and two rear.

* * * * *